Dec. 17, 1968  R. E. DAVIS  3,417,241
EMPTY BOTTLE INSPECTION METHOD AND APPARATUS UTILIZING
BOTH WATER SOLUBLE AND OIL SOLUBLE FLUORESCENT DYES
Filed Dec. 7, 1965                                    2 Sheets-Sheet 1
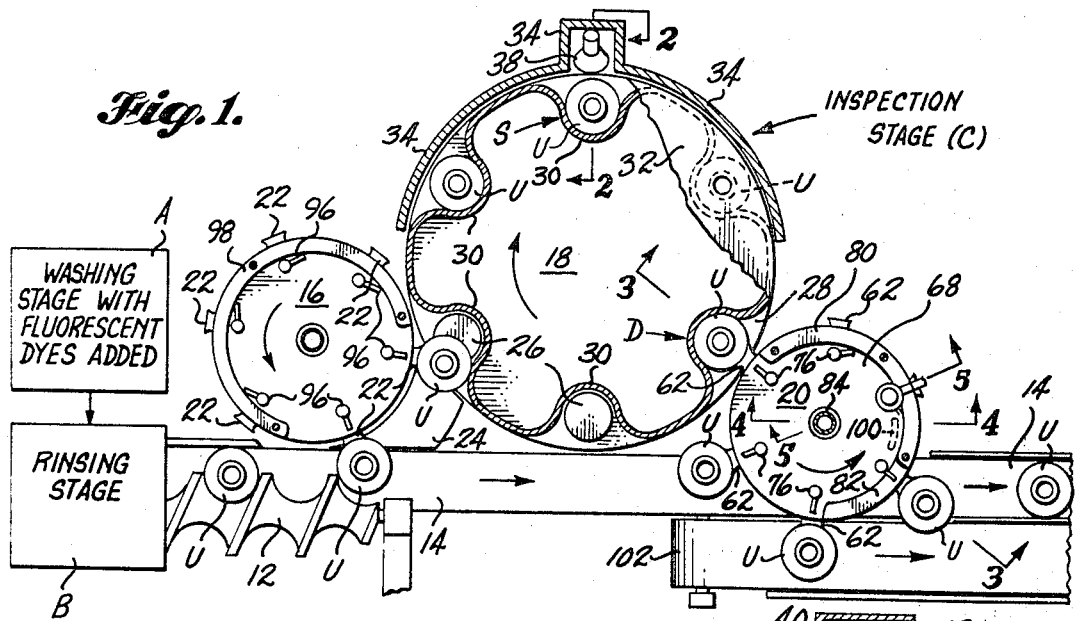
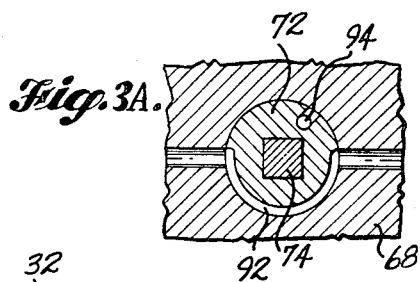
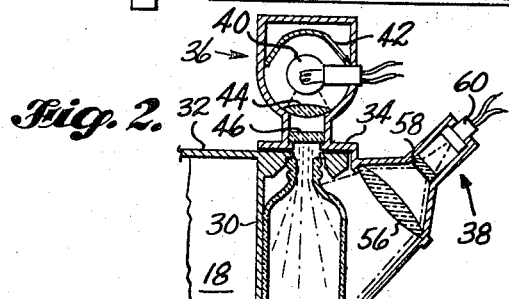
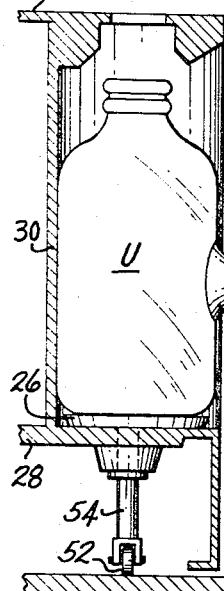
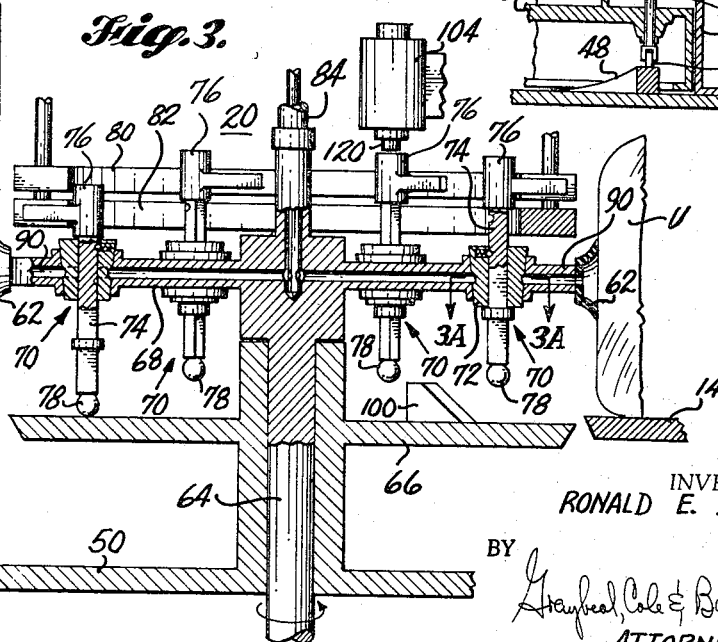
INVENTOR.
RONALD E. DAVIS
BY
*Graybeal, Cole & Barnard*
ATTORNEYS

INVENTOR.
RONALD E. DAVIS
BY
ATTORNEYS

United States Patent Office 3,417,241
Patented Dec. 17, 1968

3,417,241
EMPTY BOTTLE INSPECTION METHOD AND APPARATUS UTILIZING BOTH WATER SOLUBLE AND OIL SOLUBLE FLUORESCENT DYES
Ronald E. Davis, 3211 W St., Vancouver, Wash. 98663
Filed Dec. 7, 1965, Ser. No. 512,161
17 Claims. (Cl. 250—71)

ABSTRACT OF THE DISCLOSURE

Empty bottle inspection by washing in a hot caustic wash solution containing a combination of environmentally stable water soluble and oil soluble fluorescent dyes to provide exhaust of one or the other of the dyes, or both, onto any unremoved contaminate or debris in the bottle, whether of animal, vegetable or mineral oil origin. Inspection is by conveying a washed and rinsed bottle into a light tight shroud and illuminating it with ultra-violet light, with light sensor means being arranged to detect spectrally shifted energy emanating from the bottle while in the shroud and controlling "accept" and "reject" bottle handling mechanism responsive to the level of such detected energy.

---

The present invention relates to an inspection technique, and a novel wash solution composition used therein, for the inspection of transparent or translucent bottles and the like for the presence of any contaminant or debris.

More specifically, the present invention involves use of both water soluble and oil soluble fluorescent dyes in a hot caustic wash solution so that one or the other of the dyes will exhaust onto any contaminant or debris in a bottle, whether such contaminant or debris be of animal, vegetable or mineral oil origin.

Heretofore, it has been conventional practice in the field of bottle inspection to inspect wash bottles for cleanliness simply by illuminating the washed bottles with white or colored light in the visible light spectrum, relying on light reflected by or passed through the bottle to render any contaminant or debris detectable. The inspection can be done either simply visually, or by photoelectric means, accompanied by automatic rejection of dirty bottles. One such automatic type of equipment in common use is the Mark IV empty bottle inspector, manufactured by the Milwaukee Division of George J. Meyer Manufacturing Co., Milwaukee, Wis. In this equipment, an electronic scanning eye inspects the bottom of the bottle, illuminating the same from above and through the neck of the bottle. Upon variation change in reflected or passed light, signifying the presence of contaminants or debris, an energization signal generated by a photoelectric sensor unit closes a relay which operates a reject mechanism to move the dirty bottle off the clean bottle conveyor line and into a dirty bottle discharge line. With such manner of inspection, involving simply reflected or passed visual light, the inspection is oftentimes not completely satisfactory in that some contaminants and debris (such as butterfat scum or a film of kerosene, simply by way of example), are not substantially light reflective or light absorptive.

A survey of the prior art with respect to inspection techniques for bottles and the like has revealed a prior teaching of the use of a fluorochrome or fluoroescent dye as a visual inspection aid to test the efficiency of a utensil washing process. In this respect, specific reference is made to an article by Emil Domingo, entitled "Fluochromatic Method—A New System for Measuring the Efficiency of the Washing Process," appearing in the Quarterly Bulletin—Association of Food and Drug Officials of the United States, Vol. 13, No. 3, pages 100–107 (1949). This article in general discloses the washing of a food utensil such as a milk bottle, then examining the food utensil under filtered ultraviolet light to note the fluorescence thereof, then immersing or spraying the utensil with a solution of a fluorochrome or fluorescent dye for a few seconds and rinsing of the utensil, then again examining the utensil under ultraviolet light. Domingo indicates that upon such re-examination a clean surface will show up as an even dark violet or purple background, while food residues shine very brightly, and residual films of milkstone appear as "more or less continuous films of characteristic color." The fluorochrome or fluorescent dyes disclosed in this article, and there noted as having been found to be most useful, especially with milk residues, are: Fluorescent Purple 2G; Blancaphore; Paper White; Brilliant Sulpho Flavine; Brilliant Yellow; Fluorescent Violet; Primulin; Acetate Flourescent Blue I; Tiponal BVA. However, it has been determined that each of the indicated fluorochromes is categorizable as water soluble and oil insoluble, and that the degree of pickup of any such fluorochrome dye by a mineral oil type (i.e. oil-base or hydrocarbon type) contaminant, such as a kerosene or gasoline film, for example, would be minimal at best, and the efficacy of any such dye substance would therefore be limited essentially to contaminants and debris of animal or vegetable origin. Moreover, the inspection technique disclosed by the Domingo article involves the solution of fluorochrome or fluorescent dye being applied to the utensil subsequent to the washing thereof, rather than being placed directly in the wash solution, which would involve a separate handling step or stage in automated equipment and a considerable loss or "carry over" of the dye at the production rates at which bottle washing machines are otherwise capable (e.g. 500–1000 bottles per minute, for example).

It is also known, as disclosed in Forest et al. U.S. Patent No. 2,499,466, that a fluorescent pigment in powder form can be used to accentuate the surface irregularities of a bottle or the like, by deposition of the powdered pigment in such irregularities to a greater extent than the deposition thereof occurs on a more smooth surface. However, use of a pigment in particulate form is manifestly unsuitable for post-rinse inspection of washed bottles or the like, since such pigment would of itself contaminate even an otherwise clean bottle. Illumination by ultraviolet light has also been disclosed as useful for analysis of milk, particularly with regard to caramelization or scorching thereof incident to the preparation of condensed milk, as disclosed in Borg U.S. Patent No. 2,776,213. Use of tracer solutions containing radioactive isotopes, to determine the presence and location of contamination in food processing or conduit systems has also been proposed, as Dvorkovitz et al. U.S. Patent No. 2,968,733.

Objects, features and advantages of the present invention include the following:

(a) The provision of an empty bottle inspection technique effective over a wide spectrum of types of contaminants and debris, and effective to permit detection of even minute quantities of such contaminants and debris, whether of animal, vegetable or mineral oil origin;

(b) The provision of both water soluble fluorescent dyes and oil soluble fluorescent dyes which are compatible with each other and environmentally stable in hot caustic wash solutions as conventionally employed in the commercial washing of bottles and the like.

(c) The provision of fluorescent dyes which are collectively capable of exhausting onto contaminants of debris of animal, vegetable, or mineral oil origin and which are effective, in the form retained by the contaminants or debris, to sufficiently increase the intensity of fluorescent emission to be effectively detectable by radiant energy responsive detection means operating in or near the visible light spectrum, and thus susceptible of automation of the inspection and rejection phases of otherwise conventional bottle washing equipment systems:

(d) The provision of an empty bottle inspection technique affording greater reliability due to the detection of electromagnetic energy spectrum shift rather than simply the relative amount of light emanating from an inspected bottle;

(e) The provision of an empty bottle inspection technique wherein the quality of the inspection is not dependent on the uniformity of bottle manufacture, as is commonly the case with present inspection techniques where raised lettering or the like on the bottom of the bottle affects the quality of inspection because it affects the amount of light passed through the bottom of the bottle;

(f) The provision of an empty bottle inspection technique wherein the entire inner surface of the bottle (and in some cases all surfaces thereof) is inspected, as distinguished from inspection of only the bottom of the bottle, as is now conventional practice;

(g) The provision of an empty bottle inspection technique which is fully compatible with the speed capabilities of presently used bottle washing equipments; and (h) The provision of a combination of oil soluble and water soluble fluorescent inspection sensitizing agents for inclusion in the wash water of a wash system for bottles and the like, wherein such agents are for all practical purposes odorless, tasteless and non-toxic.

These and other objects, features, advantages and characteristics of the present invention will be apparent from the following description of certain typical and therefore non-limitive embodiments thereof, taken together with the accompanying drawings, wherein like lettering and numbering designates like parts, and wherein:

FIG. 1 is a plan view, partially in cross-section, of the bottle inspection stage of a bottle washing installation incorporating the present invention, with the washing and rinsing stages preliminary to the inspection stage being shown diagramatically;

FIG. 2 is a fragmentary cross-sectional view of the inspection station of the equipment shown in FIG. 1, taken substantially along line 2—2 thereof;

FIG. 3 is a cross-sectional view, taken substantially along line 3—3 of FIG. 1, showing further detail as to the discharge station and discharge rotor of the inspection stage;

FIG. 3A is a detail view in lateral cross-section taken substantially along line 3A—3A of FIG. 3, showing further construction detail as to the vacuum control valve mechanism in the discharge rotor;

Figure 4:
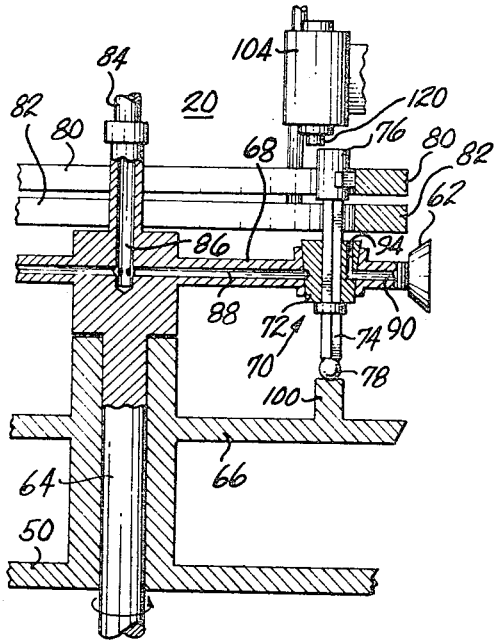
FIG. 4 is a cross-sectional view similar to that of FIG. 3, and taken substantially along line 4—4 of FIG. 1, showing a given vacuum control valve established in an upper or "accept" position.

A typical example of practice of the present invention is discussed below in connection with a generally conventional bottle washing installation involving a washing stage A with one or more hot caustic baths (made up of 5 N NaOH, at 80°–90° C., for example), with the wash stage followed by a rinsing stage B having one or more rinse stations wherein the bottles are rinsed by immersion and/or spraying, after which the washed and rinsed bottles are conveyed to and inspected at an inspection stage, generally designated C in FIG. 1. According to the present invention, an environmentally stable water soluble fluorescent dye such as Calcofluor White ST (Fluorescent Brightening Agent 28), and an environmentally stable oil soluble fluorescent dye such as Fluorol OB (Fluorescent Brightening Agent 76), are placed in one or more of wash baths of washing stage A in respective concentrations of about 50 and about 100 parts per million by weight, for example. Conveyance of the bottles through the washing stage A and rinsing stage B is accomplished in a conventional manner, as by screw conveyor means diagrammatically indicated at 10, and shown structurally on the outfeed side of rinsing stage B, at rotated screw conveyor 12, and line support belt conveyor 14. In the inspection stage C, an infeed wheel or rotor generally designated at 16, and inspection wheel or rotor generally designated at 18, and a discharge or outfeed wheel or rotor generally designated at 20 are synchronously rotated by drive means (not shown), which is conventional per se. Infeed rotor 16 comprises a plurality (six being shown) of vacuum cups 22, each controlled in sequence to pick up a rinsed bottle U from the conveyor means 12, 14, and move it across a stationary support plate 24 and deposit the bottle U on a given bottle support or platform 26 at an associated bottle conveying position in the inspection rotor 18. As in part shown at FIG. 2, the inspection rotor 18 comprises a rotary base 28 in which the bottle supports 26 are journaled for vertical movement, and also comprises radially inset wall portions 30 which partially envelope each inspection position associated with the supports 26, which base 28 and wall 30, in conjunction with a cover plate 32 (FIGS. 2 and 3; and in part shown in FIG. 1), serve as portions of a light tight shroud for each associated bottle during the time the bottle is moved through the inspection station S coursed by the inspection rotor 18. Completing the elements providing a light tight shroud for each bottle U at the inspection station S (shown at the top of FIG. 1 and in cross section in FIG. 2), is a stationary hood 34 peripherally spanning the rotor 18 in the region of the inspection station. Said hood 34 at the inspection station S is configured to mount and accommodate an ultra-violet light source generally indicated at 36, and an emission sensor, generally indicated at 38. Said light source 36 comprises an electrically energized ultra-violet light emitter 40 (typically a high pressure Hg vapor lamp, Model H85A3), a parabolic reflector 42 (such as Alzak processed aluminum), a quartz lens 44, and an optical interference filter 46 (such as manufactured by Baird-Atomic, Inc., Cambridge, Mass., with a pass band of about 3600–3700 Angstroms (A.), for example). The components of the light source 36 are selected to provide a narrow band of excitation energy appropriate for excitation of the particular fluorescent dyes selected; in this instance an excitation frequency of about 3660 A. plus or minus 50 A.

To provide complete illumination of the entire inner surface of the bottle U, each bottle U is vertically elevated so the crown of the bottle is nested immediately below the light source 36 at the inspection station, as shown at FIG. 2. As also shown at FIG. 2, such vertical elevation of each bottle U at the inspection station S is accomplished by a stationary cam 48 mounted on the stationary supporting frame 50 for the inspection stage, which cam 48 acts on cam follower wheel 52 and shaft 54 to elevate the bottle support 26 as the bottle U is rotated into the inspection station.

Emission sensor unit 38 comprises a quartz lens 56, and (optionally) an optical interference filter 58, together with a suitable optical sensor 60 (such as RCA photomultiplier tube Type 7029), having a response band of about 4000 to about 8000 A. and a maximum spectral response at about 4900 A.

With excitation at about 3660 A., any debris in a given bottle U which has exhausted thereon one or both of the fluorescent dyes placed in the wash solution at washing stage A, will emit spectrally shifted energy. Assuming for example that the bottles U are the conventional brown beer bottle, which of itself absorbs much of the emitted energy and thus acts as a filter to an extent, the primary energy emissions emanating from the bottle will be in the range of about 5200–8000 A. With the photomultiplier tube 60 responsive in this range (and with modification of the emitted energy to further narrow the response band if desired, as by use of an interference filter 58), the energy reaching the tube 60, when of predetermined intensity, causes a level of current flow through the photomultiplier tube 60, adequate to initiate a "reject" sequence. Such reject sequence is discussed more specifically below in conjunction with the control circuit of FIG. 6 and the associated mechanism in the discharge rotor 20.

After inspection at the inspection station S, each bottle U progresses to a discharge station D on inspection rotor 18 where it is picked up by one of the vacuum cups 62 of the discharge mechanism generally indicated at 20. Construction and operation of the discharge mechanism 20 will be best understood by a composite consideration of FIGS. 1 and 3, and the interaction thereof with the sensor unit at inspection station S will be best understood with reference to FIGS. 4 and 5 and the control circuit of FIG. 6.

As shown in FIG. 3, and also to some extent in FIG. 1, the discharge mechanism 20 comprises a rotating spindle 64 journaled in and supported by a stationary cam plate 66 standing upwardly from the frame member 50, which spindle 64 mounts a rotor plate 68 carrying an annularly arranged array of vacuum control valves 70, each having a valve body 72 rotatable with respect to the rotor plate 68, and each in turn having an axially movable shaft 74 keyed in the valve body 72, with a radially projecting cam follower type control arm 76 in turn keyed to the upper end of each shaft 74, and with an axially projecting cam follower 78 arranged at the lower end of each shaft 74. Each such control valve 74 and associated control arm 76 are spring loaded (by spring means not shown) to be normally in a position with the cam arm 76 extending radially outwardly from the center of rotor plate 68 (as is the case with four such arms as shown in FIG. 1), and to be rotated to rotate the associated valve body 72 with respect to the plate 68 whenever the control arm 76 encounters and is moved to a trailing position as a result of contacting one of the arcuate cam plates 80, 82.

A vacuum line 84 (from a vacuum source, not shown) is connected with a central manifold 86 within the rotor plate 68, and radially extending passageways 88 each communicate such central manifold 86 with one of the vacuum control valves 70. Respective outboard radial passageways 90 in turn extend from each respective control valve 70 to the associated vacuum cup 62. The passageways internally of each valve body 72 (as shown in FIG. 3A for example) comprises a passageway 92 arranged to communicate the associated passageways 88, 90 and thus apply vacuum within the associated vacuum cup 62 whenever the associated control arm 76, acting through the associated shaft 74, is in the radial or normal attitude. However, when a given arcuate cam 80, 82 moves the control arm 76 to a trailing position, rotation of the valve body 72 interrupts communication between the passage 92 and the associated passage 90, and the latter is placed in communication with a generally axially extending passageway 94 in the valve body 72, and vented to atmosphere through said passageway 94. In short, a vacuum cup 62 operates through its associated valve and cam mechanism to retain the associated bottle U whenever the control arm 76 extends radially, and operates to release the associated bottle U whenever such control arm 76 is moved to a trailing position by an associated cam 80 or 82, as the case may be.

As will be apparent, and although not illustrated in detail, the infeed rotor 16 similarly comprises an array of valves, each having a spring loaded valve arm 96, and each associated with a vacuum cup 22, which arms 96 are each successively moved to a trailing position by an arcuate cam 98 to effect cyclic gripping of a bottle initially on the belt conveyor 14, and transfer and release thereof on an associated support platform 26 of the inspection rotor 18.

An upstanding cam 100 is arranged on plate 66 to effect a lifting of each valve shaft 74, through contact with cam follower 78 thereof, in the event such shaft 74 is not already in an upper position as it passes the cam 100. In such upper position of the valve shaft 74, the associated control arm 76 is maintained in contact with the upper arcuate cam 80 until just before the associated vacuum cup 62 arrives at the pickup station, whereupon the cam arm 74 clears the cam 80 and rotates to radial position to apply vacuum to the vacuum cup 62 and pick up the bottle U at the discharge station D of the inspection rotor 18. With the bottle U thus retained, continued rotation of the discharge rotor 20 progresses until the cam arm 76 again encounters the cam 80, and the release of vacuum incident to rotation of the valve body 72 releases the bottle U and leaves such free to continue its movement along the conveyor belt 14, which at this discharge point can otherwise be described as the "accept" line. However, should a given valve control shaft 74, after clearance of the raise cam 100, be again lowered so as to be in register with the lower arcuate cam 82, the pickup of the associated bottle U occurs as before but the associated control arm 76 encounters cam 82 and the resultant movement of the cam arm 76 causes release of the vacuum in associated vacuum cup 62 and deposit of the bottle U on separate belt conveyor 102, which can otherwise be termed the "reject" line.

Figure 6:
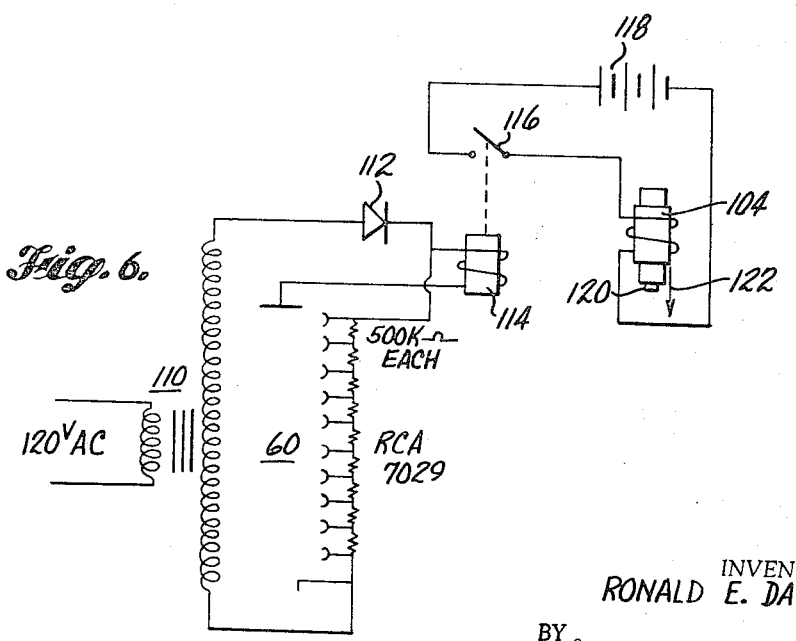
FIG. 6 is a schematic showing of a typical control circuit, involving phototube scanning of the bottles at the inspection station, and solenoid actuation responsive thereto for vacuum valve position control.

Whether or not a given valve control shaft 74 moves into the inspection rotor discharge station in an upper position or in a lower position (respectively under the control of cam 80 or cam 82) is controlled by whether or not solenoid 104 is energized at the time the associated valve shaft 74 is located axially under the solenoid. It is a function of the control circuit shown at FIG. 6 to selectively control solenoid 104 so that such solenoid is energized whenever an associated bottle has been sensed by the photomultiplier 60 in the inspection station S as containing fluorescent dye containing debris. The control circuit for accomplishing this action is shown in FIG. 6. Arranged across the secondary of power transformer 110 is a biasing diode 112 and the dynodes and cathode of a suitable photomultiplier tube 60, such as RCA Model 7029, with the respective dynodes being connected in series through suitable isolating resistances, each having a suitable value such as 500K ohms, for example. Control solenoid 114 is connected between the cathode of the diode 112 and the plate of the photomultiplier tube 60, and upon reception by the cathode of tube 60 of sufficient light from the debris in a given bottle, and after multiplication of the generated current through action of the series of dynodes in the tube 60, the current flow to the plate of the tube 60 causes energization of the control solenoid 114, which in turn closes contact 116 thereof, connecting solenoid 104 across a suitable DC power source schematically indicated at 118. This energization of solenoid 104 causes downward movement of normally upwardly biased core 120 thereof, as diagrammatically indicated at 122.

As will be noted in FIGS. 1, 3, 4 and 5, the solenoid 104 is located substantially two positions ahead of the bottle pickup position of discharge rotor 20, and the inspection station S is located substantially two positions from the discharge position D of the inspection rotor 18. These relative rotational positions in effect provide a "memory" in the discharge mechanism as to any given bottle to be rejected, in that, although the solenoid 104 is energized instantaneously with the occurrence of the photomultiplier tube 60 sensing radiation from the bottle U in the inspection station S, and although such energization causes substantially instantaneous transfer of the associated valve control shaft 74 from its upper position (FIG. 4) to its lower position (FIG. 5) the effect of such transfer is not manifested until the bottle U has moved to the discharge station D, has been picked up by the associated vacuum cup 62, and has moved around the discharge rotor 20 until the control arm 74 contacts the lower or "reject" cam 82 rather than passing above it and eventually contacting the "accept" cam 80, as it would have done had the shaft 74 not been shifted to the lower position by the solenoid 104.

Figure 5:
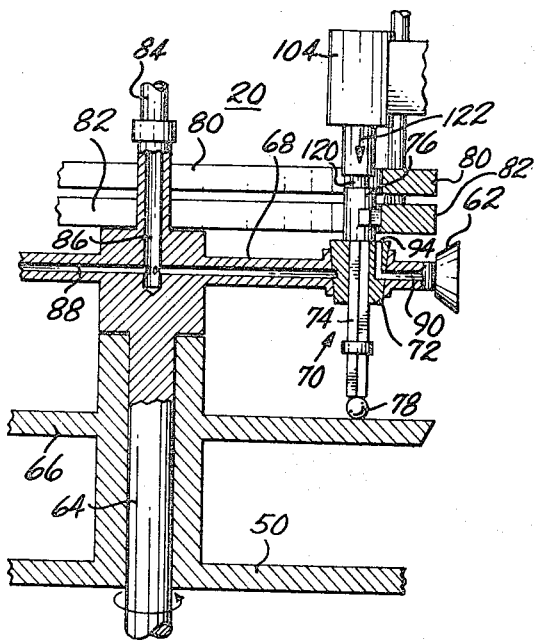
FIG. 5 is a view similar to that of FIG. 4, and taken substantially along line 5—5 of FIG. 1, showing a given control valve established in a down or "reject" position.

The fragmentary cross-sectional views at FIGS. 4 and 5 respectively show the particular correlation of elements at the moment each valve shaft 74 is moved or "reset" to an upper position subsequent to release of the preceding bottle U (whether or not such release was actuated by cam 80 or cam 82), and the correlation of elements at the time of energization of the solenoid 104 and the consequent transfer of the shaft 74 and control arm 76 to a lower position so that the latter is responsive to cam 82.

As of course known, empty bottles are of varying color and thickness. The amount of light that passes through any given bottle will depend on its filtering effect, i.e. its degree of transparency or degree of translucency. In the case of brown beer bottles, for example, most "long" light waves (i.e. waves near the red end of the visible light spectrum) pass through the bottle while most "short" waves (i.e. wave near the violet end of the visible light spectrum) are filtered out. Green bottles in general exhibit a filtering effect wherein more of the "long" waves and less of the "short" waves are absorbed.

As indicated, inspection of bottles according to the present invention involves illuminating or irradiating the rinsed bottles with a beam of ultra-violet light, directed into the interior of each bottle while the bottle is located in an inspection station. For any given type of bottle, the light spectrum pass band and intensity of the emitted energy under a given amount of ultra-violet illumination is readily determinable by pre-test of a typical clean bottle of the same type. From such pre-test it can be determined how much of the illuminating energy, and at what frequencies, any given type of bottle normally passes under ambient conditions (i.e. when clean), and the emission sensor means can be appropriately pre-set so as to not energize the associated reject circuit in the event the energy spectrum sensed for a bottle is ambient, i.e. normal for a clean bottle. However, a bottle which is "dirty" in the sense of containing some contaminant or debris on which a substantial amount of either water soluble fluorescent dye or oil soluble fluorescent dye has been picked up from the wash solution, by the fluorescent emissions emanating from the contaminant or debris, will create a non-normal or unbalanced energy emission spectrum which will be detected by one or more of the emission sensors, and the bottle thus detected as non-normal in its emission spectrum is automatically rejected by sensor initiated actuation of the asociated reject mechanism.

Rather than automated inspection and rejection equipment, the positive fluorescent emission created by the fluorescent nature of the dyes exhausted onto any contaminant or debris can be readily discerned by an operator monitoring the line of bottles visually. As readily apparent, the positive emissivity of the fluorescent dyes provides characteristic colors and intensities which are much more recognizable than is the case if the contaminant or debris is only in its usual color state or is of itself transparent or substantially so.

In the context of the present invention, suitable water soluble fluorescent dyes have been found to include the following:

| Mfr. | Ident. | Colour index No. |
|---|---|---|
| American Cyanamid | Calcofluor white ST. | Fluorescent Brightening Agent 28. |
| Ciba | Uvitex CF | Fluorescnet Brightening Agent 134. |
| National Aniline | Fluorosol WS | Fluorescent Brightening Agent 48. |
| Do | Brilliant yellow C | Direct Yellow 4. |
| General Aniline | Brilliant sulpho flavine FFA. | Acid Yellow 7. |
| Do | Sulpho rhodamine B. | Acid Red 52. |

Similarly, oil soluble fluorescent dyes suitable for use in conjunction with the above dyes in the context of the present invention have been found to include the following:

| Mfr. | Ident. | Colour index No. |
|---|---|---|
| General Aniline | Fluorol 5G | Solvent Green 4. |
| Do | Fluorol 7GA | Fluorescent Brightening Agent 75. |
| Do | Rhodamine B extra base. | Solvent Red 49. |
| Do | Fluorol 0B | Fluorescent Brightening Agent 76. |

It has been further determined that for effective empty bottle inspection by use of sensor means and automated inspection and reject equipment, the concentration of the oil soluble fluorescent dye in the caustic wash solution should be at least about 10 parts per million by weight, and preferably about 50 parts per million by weight, while the concentration of the oil soluble fluorescent dye in the caustic wash solution should be at least about 20 parts per million by weight, and preferably about 100 parts per million by weight.

As will be evident, one or more water soluble fluorescent dyes can be used with one or more oil soluble fluorescent dyes to improve fluorescent emission spectrum, if desired.

While the invention has been described in connection with the inspection of bottles, it will be understood that such is equally applicable to any container-like articles which is transparent or sufficiently transluscent to allow passage therethrough of ultraviolet light and passage of the emissive radition emanating from the fluorescent dyes, to a sufficient degree to enable detection of the emitted energy.

As will be understood, the ultra-violet light source, rather than being stationarily placed above the bottle path of travel at the inspection station S, can move along with each inspection rotor position and/or can be configured to be relatively moved axially into the neck of the bottle, in the event better illumination of the inner bottle surface is desired. As will also be apparent, more than one sensor can be used at the inspection station if desired, to achieve a full scan of all bottle surfaces.

As used herein, it will be understood that the term "animal origin" relates to material which once formed part of a once animate organism having cells of catabolic origin and a cell system which is aqueous in nature. By the term "vegetable origin" is meant at least part of a living organism having a primarily anabolic growth system and a cell structure is cellulosic and aqueous in nature. By the term "mineral oil origin" is meant any oily substance of mineral origin, such as petroleum or refining derivative thereof, e.g. paint, tar, kerosene, gasoline, for example.

As used herein, the term "ambient fluorescence" refers to the characteristic emission spectrum of a given type of clean bottle being illuminated by a given ultra-violet source, without any contaminant or debris present.

As used herein, the term "environmentally stable" as applied to the various fluorescent dyes discussed, relates to the chemical stability of the dye in the environment of use, i.e. in a hot aqueous solution of concentrated caustic, the stability contemplated in this respect being of a nature of at least several (e.g. six) hours.

From the foregoing, various further modifications, adaptations, advantages and characteristics of the bottle inspection techniques and novel compositions characterizing the invention will be apparent to those skilled in the art to which the invention is addressed, within the scope of the following claims.

What is claimed is:

1. The method of inspecting transparent and translucent bottles for the presence of contaminants adhering to the bottles, said method comprising:
    (a) washing the bottle in a hot, concentrated caustic wash solution containing a substantial amount of a water soluble fluorescent dye in solute form and a substantial amount of an oil soluble fluorescent dye in solid suspension in said solution, such washing continuing for a sufficient time to allow the water soluble fluorescent dye to exhaust onto any such contaminants of animal and vegetable origin and to allow the oil soluble fluorescent dye to exhaust onto any such contaminants of mineral oil origin;
    (b) removing the bottle from the wash solution and rinsing the thus washed bottle in water;
    (c) illuminating the washed and rinsed bottle at least principally with ultraviolet light;
    (d) electrically detecting the intensity of emissive radiation emanating from the bottle while so illuminated; and
    (e) rejecting the bottle if the intensity of radiation therefrom is at an intensity above the ambient emission intensity characteristic of the bottle itself.

2. The method of claim 1, wherein said water soluble fluorescent dye is present in said wash solution in the amount of at least about 10 parts per million, by weight.

3. The method of claim 1, wherein said oil soluble fluorescent dye is present in said wash solution in the amount of at least about 20 parts per million, by weight.

4. The method of claim 2, wherein said water soluble fluorescent dye is selected from the group consisting of Calcofluor White ST, Uvitex CF, Fluorosol WS, Brilliant Yellow C, Brilliant Sulpho Flavine FFA, Sulpho Rhodamine B, and mixtures thereof.

5. The method of claim 3, wherein said oil soluble fluorescent dye is selected from the group consisting of Fluorol 5G, Fluorol 7GA, Rhodamine B Extra Base, Fluorol OB, and mixtures thereof.

6. A wash solution for transparent and translucent bottles enabling subsequent detection of contaminants left in the bottles after washing and rinsing thereof, said wash solution comprising:
    (a) water, as the solvent constituent;
    (b) caustic, present in a concentration of at least about 5% by weight;
    (c) an environmentally stable water soluble fluorescent dye, present in solute form and in the amount of at least about 10 parts per million by weight;
    (d) an environmentally stable oil soluble fluorescent dye, present in the form of a solid suspension and in the amount of at least about 20 parts per million by weight.

7. A wash solution according to claim 6, wherein said water soluble fluorescent dye is selected from the group consisting of Calcofluor White ST, Uvitex CF, Fluorosol WS, Brilliant Yellow C, Brilliant Sulpho Flavine FFA, Sulpho Rhodamine B, and mixtures thereof.

8. A wash solution according to claim 6, wherein said oil soluble fluorescent dye is selected from the group consisting of Fluorol 5G, Fluorol 7GA, Rhodamine B Extra Base, Flurol OB, and mixtures thereof.

9. Apparatus for washing and detecting contaminants adhering to the surface of transparent and translucent bottles and the like, said apparatus comprising:
    (a) a washing stage involving at least one hot, aqueous wash solution containing a chemical washing agent and containing substantial amounts of water soluble and oil soluble fluorescent dyes;
    (b) a rinsing stage in which the washed bottles are rinsed in water; and
    (c) a bottle inspection stage comprising:
        (1) synchronously driven infeed rotor means, inspection rotor means, and discharge rotor means through which the washed and rinsed bottles are conveyed;
        (2) an inspection station coursed by said inspection rotor means, including
            (a) a light-tight shroud,
            (b) an ultra-violet light source arranged to illuminate substantially the entire inner surface of a bottle within said shroud,
            (c) light sensor means arranged to receive spectrally shifted energy emanating from a thus illuminated in said shroud; and
        (3) bottle transfer mechanism operatively associated with said discharge rotor means, including
            (a) an "accept" conveyor line,
            (b) a "reject" conveyor line,
            (c) bottle handling means on said discharge rotor means to move inspected bottles from said inspection rotor means to either said "accept" conveyor line or said "reject" conveyor line, and
            (d) positioning means responsive to said light sensor means to manipulate said bottle handling means and cause the latter to transfer a bottle to said "reject" conveyor line whenever the said light sensor means receives from the bottle an amount of emitted energy above a predetermined level.

10. Apparatus according to claim 9, wherein said ultraviolet light source illuminates the bottle with energy primarily of a frequency of about 3600–3700 A., and said light sensor unit is responsive to emitted energy in the frequency range of about 4000–8000 A.

11. Apparatus according to claim 9, wherein said bottle handling means includes vacuum type bottle contacting elements, valve means for actuating same, and cam means for controlling the operation of said valves, and wherein the said positioning means comprises solenoid means operatively arranged to change the relation of said valve means with respect to said cam means to effect delivery of a given bottle to said "reject" conveyor line.

12. The method of claim 1, comprising illuminating the washed and rinsed bottle solely by ultra-violet light while the bottle is shielded from ambient light by being positioned within a light-tight shroud.

13. The method of claim 1, comprising illuminating the washed and rinsed bottle by directing ultra-violet light axially down into the neck of the bottle.

14. The method of claim 1, comprising illuminating the washed and rinsed bottle solely by ultra-violet light directed axially down into the neck of the bottle, and comprising electronically detecting the intensity of emissive radiation emanating from the bottle while so illuminated by light sensor means arranged at the side of the light-tight shroud.

15. Apparatus according to claim 9, wherein said ultra-violet light source is arranged to illuminate a bottle within said shroud by directing ultra-violet light axially down into the neck of the bottle.

16. Apparatus according to claim 15, wherein said light sensor means is arranged at the side of said light-tight shroud.

17. Apparatus according to claim 16, wherein said ultra-violet light source illuminates the bottle with an energy primarily of a frequency of about 3600–3700 A., and said light sensor means is responsive to emitted energy in the frequency range of from about 4000–8000 A.

(References on following page)

References Cited

UNITED STATES PATENTS 2,631,243   3/1953   Weber et al. _____ 250—71

OTHER REFERENCES

Quarterly Bulletin—Association of Food and Drug Officials of the United States, vol. 13, No. 3, pp. 100–107, 1949.

RALPH G. NILSON, *Primary Examiner.*

S. ELBAUM, *Assistant Examiner.*

U.S. Cl. X.R.

134—42